UNITED STATES PATENT OFFICE.

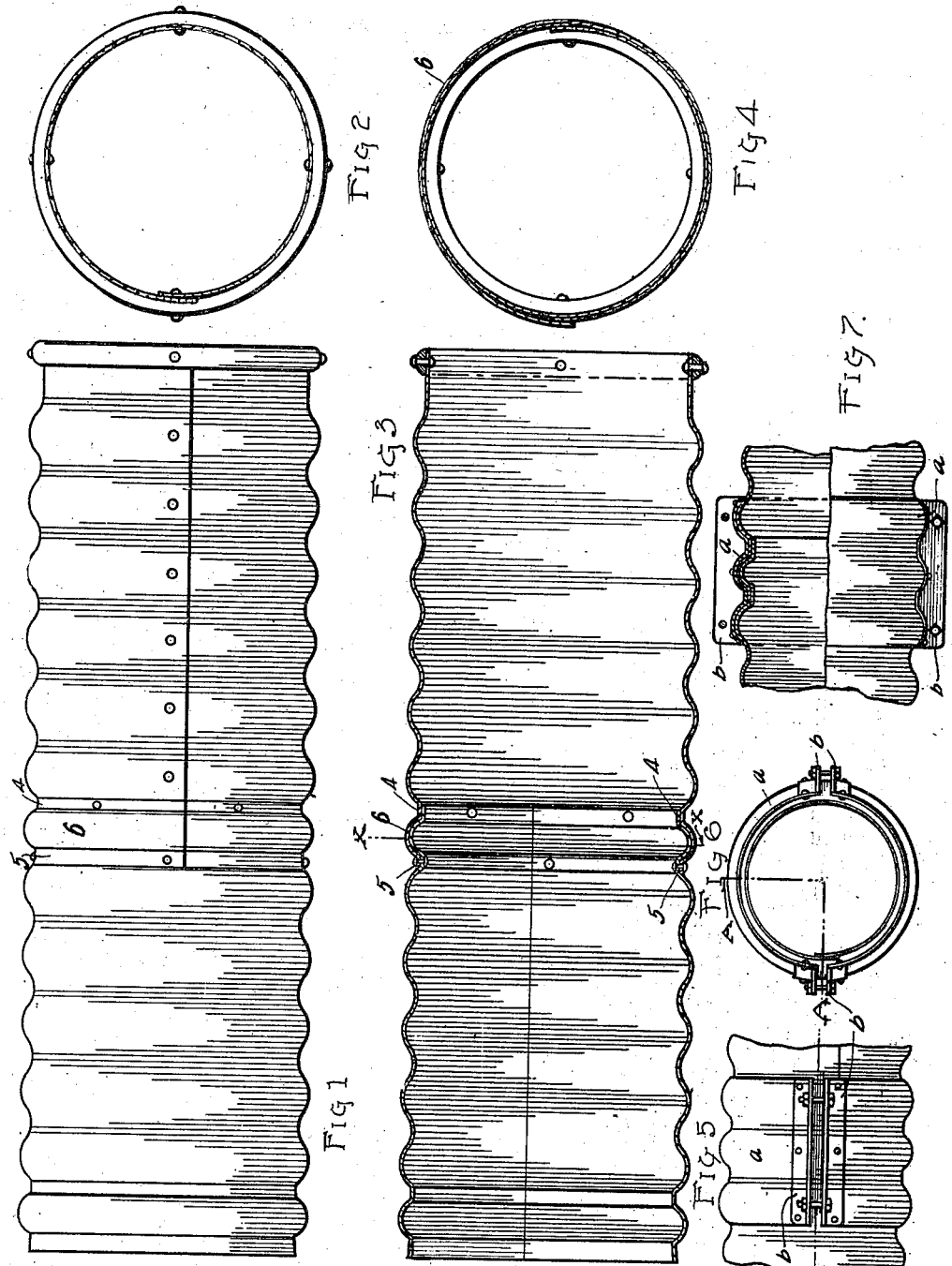

FERDINAND J. FELDT, OF PEORIA, ILLINOIS.

CORRUGATED CULVERT.

989,343.  Specification of Letters Patent.  Patented Apr. 11, 1911.

Application filed August 29, 1910. Serial No. 579,414.

*To all whom it may concern:*

Be it known that I, FERDINAND J. FELDT, a citizen of the United States, residing at Peoria, in the county of Peoria and State of Illinois, have invented certain new and useful Improvements in Corrugated Culverts; and I do hereby declare that the following is a full, clear, and exact description of the invention, which will enable others skilled in the art to which it appertains to make and use the same.

My invention relates to means for joining sheet metal corrugated culverts.

The object of my invention is to make a stable joint that will hold the completely formal culvert in longitudinal alinement, so that when thrown in the trench it need not be propped up during the filling in process, and also reinforce the joint against the danger of sagging under settling pressure of an embankment or road bed.

My invention lies in the manner of forming the terminal ends of meeting corrugations, and their union to make up the complete joint.

Referring to the drawings—Figure 1 is a side elevation, showing two joined sections. Fig. 2 is an end view of the same. Fig. 3 is a longitudinal section through two joined sections. Fig. 4 is a cross section on the line *x x* of Fig. 3. Fig. 5 is a side elevation of broken culvert sections, showing the application of a clamp. Fig. 6 is an end view of the same. Fig. 7 is a longitudinal section of the same parts shown in Fig. 5.

Each section is formed at the meeting ends of adjacent sections with flat bearing surfaces 4 and 5, with an intervening circumferential corrugation 6, and the flat bearing surfaces are provided in each meeting part with meeting perforations. The sections are adapted to be united by causing the specially formed terminal ends to be interengaged at the time the culvert is formed, or the terminal joints being left open, to be joined later when desired for use, with the flat bearing face, lying in the longitudinal plane of the culvert, in contact relation, and with the corrugation 6, interlocking, then by applying rivets, bolts or the like, a substantial joint will be provided that will not permit the culvert to sag when thrown in the trench, needing no propping, and will withstand great lateral pressure, rendering the culvert commercially desirable and very durable.

*a*, are clamp sections adapted to unite long sections in the field, and are formed to embrace at least one of the terminal corrugations of each meeting section and are provided with flanged plates, *b*, and the sectional clamp is designed to be secured in place to unite the culvert sections together by means of bolts and nuts in the usual way.

What I claim is—

1. In corrugated metal culvert sections, means for uniting them, comprising matching terminal portions of each formed with perforated flat bearing surfaces, and a circumferential corrugation, intervening between the flat surfaces, and rivets or the like for uniting the parts substantially, as shown.

2. In corrugated metal culvert sections, means for uniting them, comprising matching terminal portions of each formed with perforated flat bearing surfaces, and a circumferential corrugation, intervening between the flat surfaces, and rivets or the like, for uniting the parts, and a sectional clamp for embracing the joint and adjacent terminal corrugations substantially, as shown.

In testimony whereof I affix my signature, in presence of two witnesses.

FERDINAND J. FELDT.

Witnesses:
A. B. FINK,
W. V. TEFFT.